United States Patent
Costigan et al.

(10) Patent No.: US 10,075,437 B1
(45) Date of Patent: Sep. 11, 2018

(54) SECURE AUTHENTICATION OF A USER OF A DEVICE DURING A SESSION WITH A CONNECTED SERVER

(71) Applicant: BehavioSec, Lulea (SE)

(72) Inventors: Neil Costigan, Lulea (SE); Ingo Deutschmann, Merseburg (DE); Tony Libell, Lulea (SE); Johanna Skarpman Munter, Lulea (SE); Peder Nordström, Lulea (SE)

(73) Assignee: BEHAVIOSEC, Luleå (SE)

( * ) Notice: Subject to any disclaimer, the term of this patent is extended or adjusted under 35 U.S.C. 154(b) by 96 days.

(21) Appl. No.: 15/073,743

(22) Filed: Mar. 18, 2016

Related U.S. Application Data

(63) Continuation-in-part of application No. 14/070,654, filed on Nov. 4, 2013, now Pat. No. 9,301,140.
(Continued)

(51) Int. Cl.
*G06F 21/31* (2013.01)
*H04L 29/06* (2006.01)
(Continued)

(52) U.S. Cl.
CPC ........ *H04L 63/0861* (2013.01); *G06F 21/316* (2013.01); *G06F 21/32* (2013.01);
(Continued)

(58) Field of Classification Search
CPC ............ H04L 63/0861; H04L 63/0853; H04L 9/3231; H04L 9/3271; H04L 63/08;
(Continued)

(56) References Cited

U.S. PATENT DOCUMENTS

| 2011/0126024 | A1* | 5/2011 | Beatson ................. G06F 21/32 |
| | | | 713/186 |
| 2012/0198491 | A1* | 8/2012 | O'Connell ............ G06F 21/316 |
| | | | 725/30 |

(Continued)

OTHER PUBLICATIONS

FIDO UAF Protocol Specification v1-0 (Dec. 8, 2014).*
(Continued)

*Primary Examiner* — Theodore C Parsons
(74) *Attorney, Agent, or Firm* — Michael J. Feigin, Esq.; Feigin and Fridman LLC

(57) ABSTRACT

A computer-implemented method for secure authentication of a user to a service for executing a transaction, the method being implemented in a system including a user device including a FIDO-client, a FIDO-server of a relying party providing the service, a behaviometric server and a web server associated with the relying party, the method including a preparation stage and an authentication stage. In the preparation stage a TLS-connection is established between the user device and the web-server, behavioral input data is collected from user device, and a transaction initiation message is transmitted to the behaviometric server. In the authentication stage, behaviometric data received in the transaction initiation message is compared to a second set of behaviometric data to determine whether the data matches, and if the data matches, the transaction is authenticated by the FIDO server.

15 Claims, 1 Drawing Sheet

Related U.S. Application Data

(60) Provisional application No. 61/722,804, filed on Nov. 6, 2012.

(51) Int. Cl.
| | | |
|---|---|---|
| *H04L 9/32* | (2006.01) | |
| *H04L 9/14* | (2006.01) | |
| *H04L 9/30* | (2006.01) | |
| *G06F 21/32* | (2013.01) | |
| *G06F 21/34* | (2013.01) | |

(52) U.S. Cl.
CPC ............... *G06F 21/34* (2013.01); *H04L 9/14* (2013.01); *H04L 9/30* (2013.01); *H04L 9/3231* (2013.01); *H04L 9/3242* (2013.01); *H04L 9/3271* (2013.01); *H04L 63/06* (2013.01); *H04L 63/08* (2013.01); *H04L 63/0853* (2013.01); *H04L 67/42* (2013.01)

(58) Field of Classification Search
CPC ... H04L 9/30; H04L 9/14; H04L 63/06; H04L 67/42; H04L 9/3242; G06F 21/316; G06F 21/34; G06F 21/32
See application file for complete search history.

(56) References Cited

U.S. PATENT DOCUMENTS

| | | | |
|---|---|---|---|
| 2014/0047527 A1* | 2/2014 | Ngo | H04L 63/08 726/7 |
| 2014/0333524 A1* | 11/2014 | Liu | G06F 3/017 345/156 |
| 2016/0021081 A1* | 1/2016 | Caceres | H04L 63/08 726/7 |
| 2016/0253486 A1* | 9/2016 | Sarkar | G06F 21/316 726/7 |
| 2016/0253490 A1* | 9/2016 | Hong | G06F 21/316 726/7 |
| 2016/0269403 A1* | 9/2016 | Koutenaei | H04L 63/0861 |

OTHER PUBLICATIONS

Zighra, Adaptive Behavioral Authentication in the Enterprise (Nov. 2015).*

FIDO UAF Architectural Overview (Dec. 8, 2014).*

\* cited by examiner

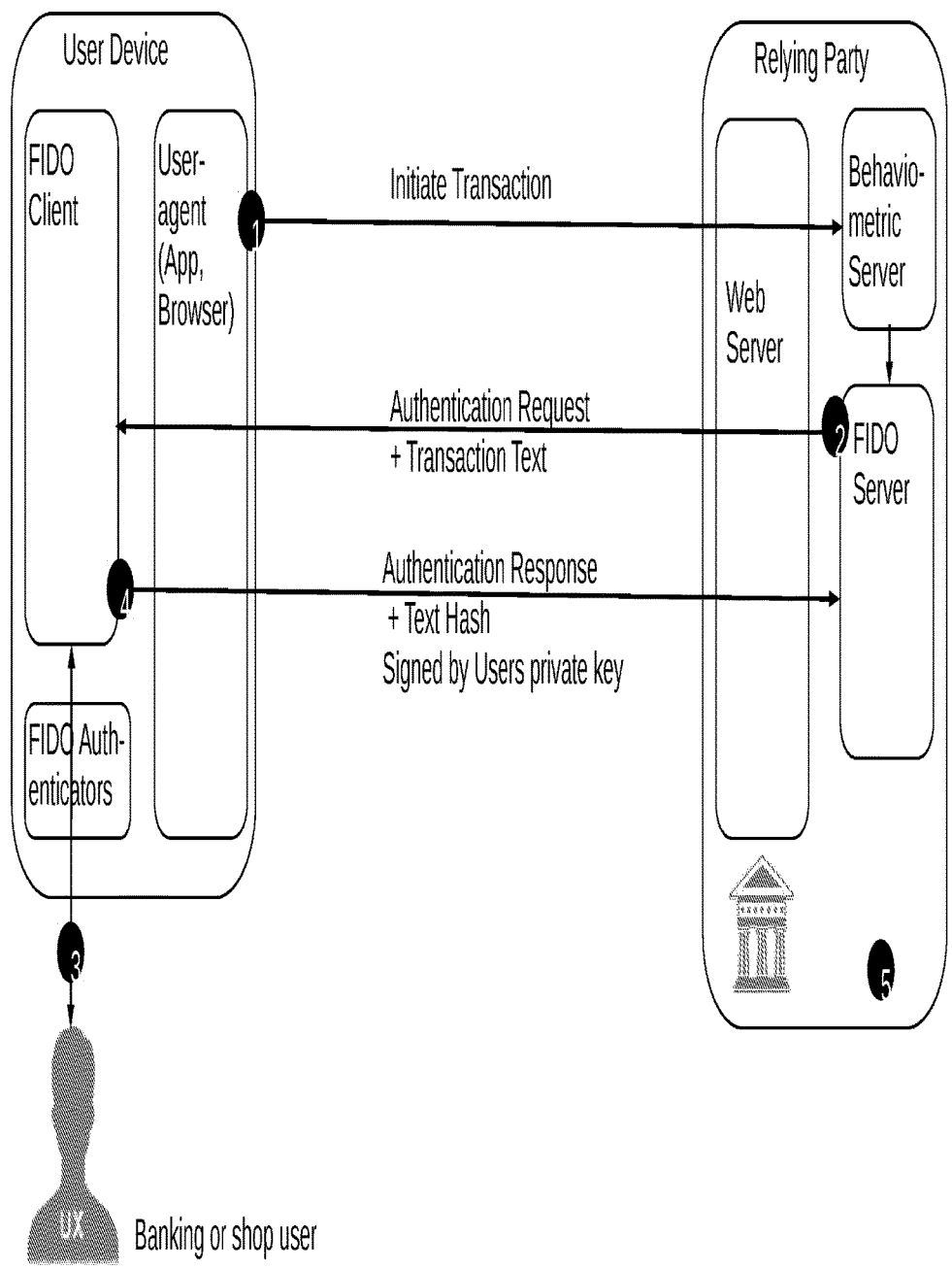

SECURE AUTHENTICATION OF A USER OF A DEVICE DURING A SESSION WITH A CONNECTED SERVER

CROSS-REFERENCE TO RELATED APPLICATIONS

The present application is a continuation-in-part of U.S. patent application Ser. No. 14/070,654 filed on Apr. 11, 2013 which claims priority to U.S. provisional No. 61/722,804 filed Nov. 6, 2012. The disclosures of the above applications are incorporated herein by reference.

BACKGROUND OF THE INVENTION

1. Field of the Invention

The principles of the present disclosure describe a method, computer program and system for securely authenticating a user of a stationary or mobile device, such as a desktop Personal Computer (PC) or a mobile device like a laptop, tablet or smart-phone, during a session with a connected server. The user device may be any suitable device, such as a personally acquired, enterprise-issued, or an enterprise Bring Your Own Device (BYOD). The operating environment of the device may be any suitable operating environment, such as home, office, in the field, etc. The service for which authentication is required may be a financial transaction, a challenge, a user agreement for releasing patient records which is followed shortly thereafter by a transaction.

Definitions:

'Authentication' is defined as the act of confirming the truth of an attribute and/or of a single piece of data claimed true by an entity.

'Federated Identity' is the means of linking a person's electronic identity and attributes, stored across multiple distinct identity management systems.

'FIDO' is defined as the Fast Identity Online standard as developed by the FIDO Alliance.org.

'UAF' is the Universal Authentication Framework as developed by the FIDO Alliance and specified in the UAF standard.

A 'UAF device', 'UAF authenticator' or 'U2F' is a biometric device implementing the client side specifications defined in the UAF standard.

A 'relying party' is a service defined in the UAF specification, which handles the registration of UAF devices and implements the specifications according to the UAF standard.

A 'FIDO server' is a server implementing at least part of the server side protocol of the UAF standard.

The terms 'Initiate Transaction', 'Authentication Request', 'Transaction Text', 'Text-Hash', 'Challenge' 'Policy', 'FIDO-Identifier' and 'authenticator attestation' all are defined as defined in the UAF standard.

An 'Identity Provider (IdP)' is responsible for (a) providing identifiers for users looking to interact with a system, (b) asserting to such a system that such an identifier presented by a user is known to the provider, and (c) possibly providing other information about the user that is known to the provider.

'MAC Message Authentication code' is a symmetrically encrypted hash of data.

A 'private key' and a 'public key' are the respective keys of a key pair used in public key encryption system like RSA or ECC, and are parts of a Public Key Infrastructure (PKI).

A 'profile database' is a database that may contain information about behavior of users.

For a secure-critical (browser- or native-app-based) client running at a device connected with a server running at a 'Relying Party', e.g. a bank, a Fast IDentity Online (FIDO) authentication of the user of said device using a multi-factor authentication is promoted by third parties, as described in FIDO Universal Authentication Framework (UAF). Users explicitly approve the use of a UAF device with a specific 'Relying Party'. Unique cryptographic keys are generated and bound to a 'Relying Party' during registration only after the user's consent. The client can be pre-installed on the operating system or web browser and interacts with the Universal Second Factor (U2F) protocol or the Universal Authentication Framework (UAF) protocol. Basically if a FIDO UAF Authenticator has a transaction confirmation display capability, FIDO UAF architecture makes sure that the system supports What You See is What You Sign mode (WYSIWYS). To avoid misunderstandings also in this disclosure the terminology of this UAF (Architectural Overview; FIDO Alliance Implementation Draft 15 Dec. 2015) will be used mostly.

2. Description of the Related Art

Typically a user using a device is authenticated for any access to a server by his unique User Name (UN) and his secret Password (PW), but this level of security is not enough for secure transactions in the context of this disclosure.

The present invention relates to FIDO UAF messages which complement advanced Federated Identity Management (FIM) frameworks as well as web authorization protocols to authenticate a user to a service. A FIM 'Relying Party' can leverage an initial authentication event at an Identity Provider (IdP), but does not define specific mechanisms for direct user authentication at the IdP.

FIDO's aim is that its specifications will support a full range of authentication technologies, including biometrics such as fingerprint and iris scanners, voice and facial recognition, as well as existing solutions and communications standards, such as Trusted Platform Modules (TPM), Universal Serial Bus (USB) security tokens, embedded Secure Elements (eSE), smart cards, and near field communication (NFC). The user's device registers the user to a server by registering a public key. To authenticate the user, the device signs a challenge from the server using the private key that it holds. The keys (e.g. Rivest, Shamir und Adleman (RSA) cryptosystem, Elliptic Curve Cryptography (ECC)) on the device are unlocked by a local user gesture such as a biometric or pressing a button. However, in UAF the user verification is performed locally. The UAF protocol does not convey biometric data to a relying party, nor does it require the storage of such data at the relying party.

U.S. Pat. No. 4,720,860 discloses a method and apparatus for positively identifying a user using a Two-factor authentication using a unique personal credit-card comprising a microprocessor. This solution as such is not adaptable for using a lot of different services via one device.

U.S. patent application Publication No. 2011/0126024 discloses at least two behavioral data of a mobile user device being gathered during a current session and used in authentication of the user to get access to the device and/or to a local or remote application or service. For that reason the mobile device contains an Encrypted Data Storage (EDS)

unit and a stored Encrypted Biometric Template (EBT) of the device owner. This disclosure doesn't teach gathering of behavioral input data entered during a current session by a background process.

U.S. patent application Ser. No. 14/070,654 discloses an improved method for authenticating an user of a mobile device using behavioral information through behavior monitoring and using the behaviometric information associated with the user profile stored in a Behaviometric-server to determine security clearance during future uses of the device, where Behavioral input data is collected during a current session by a background process.

It is an object of the present invention to provide an improved FIDO-like system for strong online authentication of a user using a device and seeking access to an online service or website, whether on the open Internet or within enterprises.

SUMMARY OF THE INVENTION

The present disclosure describes a method, a computer program algorithm and product for executing the method, and a computer-system executing the algorithm. The present invention overcomes the deficiencies and limitations discussed in the Background section at least in part by providing innovative systems, programs and methods for secure authentication of a user of a device during a session with a connected server, while reducing the problems associated with creating and remembering many online credentials.

A method for secure authentication of a user to a service for executing a transaction is provided. The method is implemented in a system including: a user device operated by the user, the user device including a FIDO-client using a FIDO-interface (e.g. a FIDO-specific browser plugin using a browser plugin interfaces or a mobile app using a FIDO-specific Standard Development Kit (SDK)) for encrypted communication of FIDO UAF messages using a Transport Layer Security (TLS) protocol, and a user-agent;
 a FIDO-server of a relying party providing the service;
 a behaviometric-server in communication with the user agent of the user device and with the FIDO-server using a unique and secret FIDO-identifier (e.g. a hash-value created from Relying Party, date and time); and a web server associated with the relying party, the web server being in communication with the FIDO server, the FIDO client, and the behaviometric server, the method including: a) in a preparation stage:
  i. upon user initiation of a session by establishing a TLS-connection between the user device and the web-server, generating a unique session ID;
  ii. using a background process running during the session and using the session ID, collecting behavioral input data from at least one user input component of the user device, and storing the behavioral input data in a non-transitory storage medium housed within the user device;
  iii. transmitting, from the user agent to the behaviometric server, via the TLS-connection and the web server, a transaction initiation message including the FIDO-identifier and at least a portion of the behavioral input data stored in the non-transitory storage medium; and
 b) in an authentication stage:
  i. at the behaviometric-server, comparing the received FIDO-identifier and the received portion of the behavioral input data to a second FIDO-identifier and a second set of behavioral input data collected during prior use of the service by the user;
  ii. at the behaviometric server, determining whether the received FIDO identifier matches the second FIDO identifier and whether the portion of the behavioral input data matches the second set of behavioral input data, whereby a match results in an authentication, and a lack of a match results in a rejection of privileged access sought by the user;
  iii. if the determining results in a match:
   1. transmitting the transaction initiation message from the behaviometric server to the FIDO-server;
   2. at the FIDO-server, generating an authentication request including the FIDO-identifier, a transaction message, and a related has of the transaction message, and transmitting the authentication request to the FIDO-client;
   3. at the FIDO client, prompting the user to sign the hash of the transaction message using a private key of an asymmetric key-pair associated with the user;
   4. at the FIDO-client, in response to the user providing the signed hash of the transaction message, generating an authentication response including the signed hash;
   5. transmitting the authentication response from the FIDO client to the FIDO server;
   6. at the FIDO server, validating the signed hash of the transaction message included in the authentication response using a public key of the asymmetric key-pair associated with the user; and
   7. upon validation of the signed hash of the transaction message, executing the transaction of the service.

It is a particular feature of the present invention that this solution includes a centralized behavioral check based on behavioral input data and an additional unique FIDO-identifier check based on asymmetric keys, so as to realize a strong online authentication using secure two-step verification of the user in a FIDO-like manner, and in particular, a What You See is What You Sign mode (WYSIWYS) is realized.

There is further provided, in accordance with an embodiment of the present invention, a computer program product comprising a non-transitory computer-usable medium including instructions which, when executed by a computer, cause the computer to carry out the steps of the above disclosed method.

There is further provided, in accordance with an embodiment of the present invention, a computer system comprising one or more processors, the processors being configured to cause computers to carry out the steps of the above disclosed method.

In some embodiments, the FIDO-client includes a standard FIDO-UAF-client and the FIDO server includes a standard FIDO-UAF-server. Thus an existing system based on these standard components is upgradable to a more secure one in an easy and cost saving manner.

In some embodiments, the behaviometric server includes a decryption server therein, and the user-agent sends encrypted data to the decryption server for decryption thereby. Thus a possible misuse of the data by third parties reading the communication is effectively excluded.

In some embodiments, the method further includes, prior to step b(iii)(2), sending the transaction message, signed or encrypted by Message Authentication Code (MAC) and/or a behaviometric-server-certificate, from the behaviometric server to the FIDO-server for generation of the authentification request, and, subsequent to step b(iii)(2), at the FIDO-client, decrypting the message and validating the MAC and/or a signature of the behaviometric-server using a symmetric key included in the transaction message (in case of the MAC) and/or validating the signature of the behaviometric-server using at least one of a public key of the behaviometric server and a certificate of the behaviometric-server. Thus a possible deception or change of said transaction message by third parties is effectively prevented.

In some embodiments, validating the MAC using the symmetric key includes validating the MAC using a symmetric key which was at least one of:

generated by a Public Key Infrastructure (PKI); and exchanged to the user device via a Diffie-Hellman key exchange, an elliptic curve Diffie-Hellman exchange, or an ephemeral elliptic curve Diffie-Hellman exchange. Thus a very strong authentication is realized.

In some embodiments, the method further includes, sending to the user device, from the web-server, an input form containing requiring the user to enter a text (e.g. a captcha), thereby to facilitate capture of additional behavior data relating to the user. Thus an additional and well-known user behavior can be provoked. Thus the behaviometric-server is able to match this captured behavior with previously stored behavior of the user.

In some embodiments, the prompting of the user at step b(iii)(3) includes requesting that the user enter a PIN related to the user for the service. Thus an additional security level is reached.

In some embodiments, the transmitting at step a(iii) includes transmitting transactional data from the user agent to the behaviometric server, together with transmission of the transaction initiation message. Thus it is possible to better determine whether the behavioral input data entered during the preparation stage of the current session matches the retrieved second set of behavioral input data whereby the result is an authentication or a rejection of privileged access sought by the user.

In some embodiments, the behaviometric-server is functionally connected to a profile database (DB) containing behavioral input data relating to users. Thus a huge amount of behavioral input data related to specific unique profiles is accessible.

In some embodiments, the method further includes:

creating a unique FIDO-identifier-profile associated with the FIDO identifier and storing the unique FIDO identifier profile in the profile-DB by the behaviometric-server; and adding behavioral input data, collected during a registration-session of a new FIDO-identifier for access to the service sought by the user, to the FIDO-identifier-profile in the profile database, the adding behavioral input data includes creating the asymmetric key-pair associated with the user, an attestation private key of the user at the user device, and an attestation using an attestation public key of the user's public key;

transmitting the attestation public key of the user's public key from the FIDO-client to the FIDO-server, and storing the attestation public key at a cryptographic authentication key reference database at the relying party; and at the FIDO-server, creating a registration request to perform a connection-oriented communication between the FIDO-client and the FIDO-server for the duration of the transaction for which privileged access is sought by the user and received by the FIDO-client, wherein the new FIDO identifier is related to the added collected behavioral input data.

Thus for later sessions including a transaction related to the FIDO-identifier, there is always behavioral input data available.

In some embodiments, the steps of creating a unique FIDO-identifier-profile and of adding behavioral input data during the registration-session are carried out only if new personal data of the user is available. Thus for later sessions including a transaction related to the user, there is always reliable behavioral input data available. In the case that the user has more than one FIDO-identifier for the service, the quality of determination by the behaviometric-server is improved if all FIDO-identifiers of the user are considered.

In some embodiments, the transmitting at step a(iii) includes transmitting the transaction initiation message via the TLS-connection, the transaction initiation message including the FIDO-identifier, transactional information, and at least a portion of the stored behavioral input data.

In some embodiments, the behaviometric-server and the FIDO-server share at least one of a processor and a hardware component and/or the behaviometric server is disposed within a protected area of the relying party. Due to the secure-policies of the relying party, a protected physical access to the behaviometric-server may be realized.

In an alternative embodiment, the behaviometric-server and the FIDO-server are distinct servers, wherein the behaviometric server is not disposed within a protected area of the relying party, and wherein the behaviometric server is disposed on a cloud based on the Internet. Due to the secure-policies of the relying party, a virtual distributed and accessible behaviometric-server may be realized.

In some embodiments, collecting the behavioral input data at step a(ii) may include collecting at least one of touch gestures, keyboard actions (dwell, flight time), movements of the device by capturing data from a gyrostatic or accelerometer sensor as well as Global Positioning System (GPS) coordinates. The behavioral input data may further include electronic input observations such as keystroke patterns and style, use of particular applications, and speech recognition. Thus, some of the collected data is provided unconsciously by the user.

In some embodiments, the device is a mobile device, e.g. a tablet or smart-phone phone. Thus, the location and movement of the device may be strongly correlated to the location and action of the user.

The novel features of the present invention are set forth in the appended claims. The invention itself, however, both its construction and its mode of operation, together with additional advantages and objects thereof, will be best understood from the following detailed description when read with reference to the accompanying drawings.

BRIEF DESCRIPTION OF THE DRAWINGS

FIG. 1 is a schematic illustration of a computer system and a method for secure authenticating in a FIDO-like manner.

DETAILED DESCRIPTION

The technology described herein includes systems, program-products e.g. a stick, and methods for verifying that a user device, which seeks access to a software service, is being operated by a human being. The technology described herein also relates to authenticating a user of a user device during a session with a connected server in a FIDO—'Confirmation Message Flow' like manner.

The systems, program-products and methods are typically used for verification and authentication of the user to software services, such as social platforms, databases, banking accounts, and/or services controlling interfaces of computers and machines, but may also be used with respect to general usage of computers.

For each interaction or specific set of interactions of the user with one or more input components of the user device, such as a mouse, keyboard, touch-pad, sensor-pen and the like, Behavior input data is collected from the input component(s). Optionally, additional sensor data may be collected, for example from one or more sensors of the user device, such as an accelerometer, a gyroscope, a magnetometer, pressure-sensors and other sensors. The collected data is stored, and may later be used by some methods.

To realize authentication of the user during a session of a client of the user device with a connected server in order to conduct a secure-related transaction in a FIDO-like manner, both the server and the client have to fulfill some special requirements specified in the FIDO and UAF protocols.

The FIDO UAF Authenticator Abstraction Layer provides a uniform API to FIDO-clients, enabling the use of authenticator-based cryptographic services for FIDO-supported operations. A FIDO UAF Client implements the client side of the FIDO UAF protocols, and is responsible for:
  interacting with specific FIDO UAF Authenticators using the FIDO UAF Authenticator Abstraction layer via the FIDO UAF Authenticator API; and
  interacting with a user agent on the device (e.g. a mobile app, browser), using user agent-specific interfaces, to communicate with the FIDO UAF Server. For example, a FIDO-specific browser plug-in would use existing browser plug-in interfaces or a mobile app may use a FIDO-specific SDK.

The FIDO UAF server is conceived as being deployable as an on-premises server by 'Relying Parties', or might be outsourced to a FIDO-enabled third-party service provider. A FIDO UAF server implements the server side of the FIDO UAF protocols and is responsible for:
  interacting with the 'Relying Party' web-server to communicate FIDO UAF protocol messages to a FIDO UAF Client via a device user agent;
  validating FIDO UAF authenticator attestations against the configured authenticator metadata to ensure that only trusted authenticators are registered for use;
  managing the association between registered FIDO UAF Authenticators and user accounts at the 'Relying Party'; and
  evaluating user authentication and transaction confirmation responses to determine their validity.

The FIDO UAF registration protocol enables 'Relying Parties' to:
  Discover the FIDO UAF Authenticators available on a user's system or device. Discovery will convey FIDO UAF Authenticator attributes to the 'Relying Party' thus enabling policy decisions and enforcement to take place.
  Verify attestation assertions made by the FIDO UAF Authenticators to ensure the authenticator is authentic and trusted. Verification occurs using the attestation public key certificates distributed via authenticator metadata.
  Register the authenticator and associate it with the user's account at the 'Relying Party'. Once an authenticator attestation has been validated, the 'Relying Party' can provide a unique secure identifier that is specific to the 'Relying Party' and the FIDO UAF Authenticator. This identifier can be used in future interactions between the pair {'Relying Party', Authenticator} and is not known to any other devices.

It is expected that users will acquire FIDO UAF Authenticators in various ways, such as:
  they purchase a new system that comes with embedded FIDO UAF Authenticator capability;
  they purchase a device with an embedded FIDO UAF Authenticator, or they are given a FIDO Authenticator by their employer or some other institution such as their bank.
  After receiving a FIDO UAF Authenticator, the user must go through an authenticator-specific enrollment process, which is outside the scope of the FIDO UAF protocols. For example, in the case of a fingerprint sensing authenticator, the user must register their fingerprint(s) with the authenticator. Once enrollment is complete, the FIDO UAF Authenticator is ready for registration with FIDO UAF enabled online services and websites. Some authenticators may sample biometric data such as a face image, fingerprint, or voice print. Others will require a PIN or local authenticator-specific passphrase entry. Still others may simply be a hardware bearer authenticator. The UAF protocol generates unique asymmetric cryptographic key pairs on a per-device, per-user account, and per—'Relying Party' basis.

Reference is now made to FIG. 1, which is a schematic illustration of a computer system for secure authentication of a user 6 of a mobile device 7, which is illustrated as a smart-phone. The mobile device includes a FIDO-client 8, such as a FIDO-UAF-client, connected to a FIDO-server 9, such as a FIDO-UAF-server. FIG. 1 further illustrates a method for user authentication including a FIDO-UAF-'Confirmation Message Flow' which takes place during a session for a transaction in a FIDO-UAF-like manner.

The FIDO-client 8 runs on the device using a user-agent 10 (e.g. a mobile app, browser) with a specific FIDO-interface (e.g. a FIDO-specific browser plugin using a browser plugin interfaces or a mobile app using a FIDO-specific SDK) to communicate encrypted FIDO UAF messages between the user-agent 10 of the FIDO-client 8 and a web-server 11, using a TLS-protocol. The web-server 11 is associated with both the FIDO-server 9, which is associated with a 'Relying Party' 12 illustrated as a bank, and a Behaviometric-server 13. The FIDO-server 9 and the Behaviometric-server 13 use a unique and secret FIDO-identifier (e.g. a hash-value created from Relying Party, date and time) between them. The user-agent 10 additionally sends encrypted data to a Decryption-server forming part of Behaviometric-server 13. The specific FIDO-interface enables the use of authenticator-based cryptographic services for FIDO-supported operations, which are supported by a registered FIDO-authenticator 14 based on a private key associated with the user, and a related public key, as a key pair located at device 7.

The session comprises at least two stages, an earlier preparation stage and a later authentication stage.

In the preparation stage, the following takes place in embodiments of the disclosed technology. That is, at least two or all three of the steps listed below are carried out:
a) Upon initiation of the session, when user 6 establishes a TLS-connection of user-agent 10 to web-server 11 of 'Relying Party' 12, web-server 11 generates a unique session ID for the session;

b) Behavioral input data, collected by a background process from at least one user input component of device 7 during the current session while using the session ID, is stored on a non-transitory storage medium housed within device 7;

c) transmitting, from FIDO client 8 to web-server 11, via the TLS-connection, an 'Initiate Transaction' message including the FIDO-identifier and at least a portion of the stored Behavioral input data. The web-server 11 then conveys the 'Initiate Transaction' message and the FIDO-identifier and at least a portion of the stored Behavioral input data to the Behaviometric-server 13.

In the authentication stage, the following takes place in embodiments of the disclosed technology. That is, at least three, four, five, or all of the steps listed below are carried out:

d) at the Behaviometric-server 13, comparing the received FIDO-identifier and the received behavioral data to a second FIDO-identifier and second behavioral data collected during a prior usage of the service of 'Relying Party' 12 by the user 6;

e) determining, by said behaviometric-server 13, whether the behavioral input data entered during said preparation stage of the session matches the second behavioral data, resulting in authentication of the user or in rejection of privileged access sought by user 6;

f) in the case of authentication:
  transmitting the 'Initiate Transaction' message 1, from Behaviometric-server 13 to FIDO-server 9;
  at FIDO-server 9, generating an 'Authentication Request' 2 using the FIDO-identifier, and in some cases an accompanying 'Transaction Text' and corresponding 'Text-Hash', the 'Transaction Text' and corresponding 'Text Hash' forming a 'Challenge' and a 'Policy' and transmitting the generated 'Authentication Request' to FIDO-client 8;
  at FIDO-client 8, receiving 'Authentication Request' 2 from FIDO-server 9;
  at FIDO-client 8, providing to the user 6 a request 3 for a user-action to sign the 'Text-Hash', or 'Challenge' with a unique private key of an asymmetric key-pair of user 6 stored at the device;
  at FIDO-client 8, generating an 'Authentication Response' 4 responding to the 'Authentication Request' 2 and including said 'Text-Hash', or 'Challenge', signed with the private key, and transmitting the 'Authentication Response' 4 to FIDO-server 9;
  transmitting the 'Authentication Response' 4 to FIDO server 9; and
  if at reference numeral 5 the signed 'Text-Hash', or 'Challenge', is positively validated by FIDO-server 9 using a public key located at the 'Relying Party' 12, which public key forms part of the key-pair of user 6, executing the transaction requested by user 6.

The transmission 3 from Behaviometric-server 13 to FIDO-server 9 includes the 'Transaction Text', or 'Challenge', signed or encrypted by MAC and/or by a Behaviometric-server-Certificate for generation of the 'Authentification Request' 2. FIDO-client 8 can decrypt the transmission and check the MAC and/or the signature of Behaviometric-server 13 by using a symmetric key included in the transmission, and/or by using an a public key and/or a certificate of Behaviometric-server 13 included in the transmission. The symmetric key of the MAC is generated by a PKI and/or exchanged to device 7 via ephemeral Elliptic curve Diffie-Hellman key exchange.

Web-server 11 may also send to user 6 an input form containing a text (e.g. captcha), which user 6 has to enter, in order to capture more behavior of the user 6. The request 3 for user-action includes a request for a PIN related to user 6 with $ for the service of the bank. Behavioral input data is captured from user 6 when the user uses a banking application or a banking website. The behavior of user 6 is captured when entering credentials like username/passwords or transactional data like beneficiary, account numbers or other banking related data, or even when entering credit card data in a shop environment. Every interaction of user 6 with the user device can be used to capture his behavior together with the transaction. The behavioral input data may include touch gestures, data relating to keyboard actions (dwell, flight time), data relating to movements of device 7 by capturing data from a gyrostatic or accelerometer sensor, as well as GPS-coordinates. The behavioral input data may further include electronic input observations such as keystroke patterns and style, use of particular applications, and speech recognition.

FIDO-client 8 transmits the 'Initiate Transaction' message 1 including the FIDO-identifier, transactional information, and at least a portion of said stored behavioral input data to web-server 11, via the TLS connection. Web server 11 then conveys the 'Initiate Transaction' message 1, together with the FIDO-identifier, the transactional information and the portion of the stored behavioral input data to the Behaviometric-server 13.

Behaviometric-server 13 as shown in FIG. 1 is located inside the protected area of 'Relying Party' 12. However, as well be understood by a skilled person, Behaviometric-server 13 may also be located outside of the protected area of 'Relying Party' 12, and may be anywhere, such as in a cloud based on the Internet. Behaviometric-server 13 is connected to a profile DB (not explicitly shown) containing Behavioral input data. A unique FIDO-identifier-profile is created and stored in the profile-DB by Behaviometric-server 13, such that collected Behavioral input data is added during a Registration-session of a new FIDO-identifier for access to the service sought by user 6. The registration session includes the creation of the user's key-pair with the user's attestation private key at device 7 and for creation of an attestation using the user's attestation public key of the user's public key, which is transmitted by FIDO-client 8 to FIDO-server 9 and stored at a 'Cryptographic authentication key reference DB' (not explicitly shown) at the 'Relying Party' 12. FIDO-server 9 creates a 'Registration Request' and a 'Policy' to perform a connection-oriented communication between FIDO-client 8 and FIDO-server 9 during the span required for the transaction, the communication enabling privileged access sought by user 6 for the transaction and received by FIDO-client 8, whereby the FIDO identifier is related to the collected behavioral input data. Also, a unique user-profile is created and stored in said profile-DB by Behaviometric-server 13 and collected behavioral input data is added during the Registration-session if new personal data of user 6 are available.

Although the present invention was shown and described with references to the preferred embodiments, these are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

The invention claimed is:

1. A computer-implemented method for secure authentication of a user to a service for executing a transaction, the method being implemented in a system including:
- a user device operated by the user, the user device including a FIDO (Fast IDentity Online)-client using a FIDO interface for encrypted communication of FIDO UAF (Universal Authentical Framework) messages, and a user-agent;
- a FIDO-server of a relying party providing the service;
- a behaviometric server in communication with the user-agent of the user device and with the FIDO-server using a FIDO-identifier; and
- a web server associated with the relying party, the web server being in communication with the FIDO server, the FIDO client, and the behaviometric server, the method comprising:
- a. in a preparation stage
  - i. upon user initiation of a session by establishing a TLS-connection between the user device and the web-server, generating a unique session ID;
  - ii. using a background process running during said session and using said session ID, collecting behavioral input data from at least one user input component of the user device, and storing said behavioral input data in a non-transitory storage medium housed within the user device;
  - iii. transmitting, from the user agent to the behaviometric server, via said TLS-connection and the web server, a transaction initiation message including the FIDO-identifier and at least a portion of said behavioral input data stored in said non-transitory storage medium; and
- b. in an authentication stage:
  - i. at the behaviometric server comparing said received FIDO-identifier and said received portion of said behavioral input data to a second FIDO-identifier and a second set of behavioral input data collected during prior us of the service by the user;
  - ii. at the behaviometric server, determining whether said received FIDO identifier matches said second FIDO identifier and whether said portion of said behavioral input data matches said second set of behavioral input data, whereby a match results in an authentication, and a lack of a match results in a rejection of privileged access sought by the user;
  - iii. if said determining results in said match:
    1. transmitting said transaction initiation message from the behaviometric server to the FIDO-server;
    2. at the FIDO-server, generating an authentication request including the FIDO-identifier, a transaction message, and a related hash of said transaction message, and transmitting said authentication request to the FIDO-client;
    3. at the FIDO client, prompting the user to sign the hash of said transaction message using a private key of an asymmetric key-pair associated with the user;
    4. at the FIDO client, in response to the user providing said signed hash of said transaction message, generating an authentication response including said signed hash;
    5. transmitting said authentication response from the FIDO client to the FIDO server;
    6. at the FIDO server, validating said signed hash of said transaction message included in said authentication response using a public key of said asymmetric key pair associated with the user; and
    7. upon validation of said signed hash of said transaction message, executing the transaction of the service.

2. The method of claim 1, wherein the FIDO-client comprises said FIDO-UAF-client and the FIDO-server comprises a FIDO-UAF-server.

3. The method of claim 1, wherein the behaviometric-server includes a decryption server therein, and the user-agent sends encrypted data encrypted to the decryption-server for decryption thereby.

4. The method of claim 1, further comprising:
prior to step b(iii)(2), sending said transaction message, signed or encrypted by at least one of MAC and a behaviometric-server-certificate, from the behaviometric server to the FIDO-server for generation of said authentification request; and
subsequent to step b(iii)(2), at the FIDO-client, decrypting said transaction message and validating at least one of said MAC and a signature of said behaviometric-server using a symmetric key included with said transaction message or validating said signature of the behaviometric-server using at least one of a public key of the behaviometric-server and a certificate of the behaviometric-server.

5. The method of claim 4, wherein said validating said MAC using said symmetric key comprises validating said MAC using a symmetric key which was at least one of:
generated by a Public Key Infrastructure (PKI); and
exchanged to the user device via a Diffie-Hellman key exchange, an elliptic curve Diffie-Hellman exchange, or an ephemeral elliptic curve Diffie-Hellman exchange.

6. The method of claim 1, further comprising, sending to the user device, from the web server, an input form requiring the user to enter a text, thereby to facilitate capture of additional behavior data relating to the user.

7. The method of claim 1, wherein said prompting the user at step b(iii)(3) further comprises requesting that the user enter a PIN related to the user for the service.

8. The method of claim 1, wherein said transmitting at step a(iii) includes transmitting transactional data from the user agent to the behaviometric server, together with transmission of said transaction initiation message.

9. The method of claim 1, wherein the behaviometric-server is functionally associated with a profile database containing behavioral input data relating to users.

10. The method of claim 9, further comprising:
creating a unique FIDO-identifier-profile associated with said FIDO identifier and storing said unique FIDO-identifier-profile in said profile database by said behaviometric-server; and
adding behavioral input data, collected during a registration-session of a new FIDO-identifier for access to the service sought by the user, to the FIDO-identifier-profile in the profile database, said adding behavioral input data includes
creating said asymmetric key-pair associated with the user, an attestation private key of the user at the user device, and an attestation using an attestation public key of the user's public key;
transmitting said attestation public key of the user's public key from the FIDO-client to the FIDO-server, and storing said attestation public key at a cryptographic authentication key reference database at the relying party;

at the FIDO-server, creating a registration request to perform a connection-oriented communication between the FIDO-client and the FIDO-server for the duration of the transaction for which privileged access is sought by the user for and received by the FIDO-client, wherein said new FIDO identifier is related to said added behavioral input data.

11. The method of claim 10, wherein said steps of creating a unique FIDO-identifier-profile and of adding behavioral input data during said registration-session are carried out only if new personal data of the user is available.

12. The method of claim 1, wherein said transmitting at step a(iii) includes transmitting said transaction initiation message via said TLS-connection, said transaction initiation message including said FIDO-identifier, transactional information, and at least a portion of said stored behavioral input data.

13. The method of claim 1, wherein at least one of:
the behaviometric-server and the FIDO-server share at least one of a processor and a hardware component; and
the behaviometric server is disposed within protected area of the relying party.

14. The method of claim 1, wherein the behaviometric-server and the FIDO-server are distinct servers, wherein the behaviometric server is not disposed within a protected area of the relying party, and wherein the behaviometric server is disposed on a cloud based on the Internet.

15. The method of claim 1, wherein said collecting behavioral input data at step a(ii) comprises collecting at least one electronic input observation derived from interaction of the user with said at least one user input component, said at least one electronic input observation being selected from the group consisting of a keystroke pattern, a keystroke style, keystroke dwell time, keystroke flight time, user touch values, user pressure values, and use of one or more particular applications.

* * * * *